US007108327B2

(12) United States Patent
Locke et al.

(10) Patent No.: US 7,108,327 B2

(45) Date of Patent: Sep. 19, 2006

(54) ADJUSTABLE HEAD RESTRAINT GUIDE

(75) Inventors: Gerald Locke, Lake Orion, MI (US); Eric Veine, Madison Heights, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/948,449

(22) Filed: Sep. 23, 2004

(65) Prior Publication Data

US 2006/0061188 A1 Mar. 23, 2006

(51) Int. Cl.
*A47C 1/10* (2006.01)

(52) U.S. Cl. ...................................... 297/410; 297/391

(58) Field of Classification Search ................ 297/391, 297/410

See application file for complete search history.

(56) References Cited

U.S. PATENT DOCUMENTS 4,131,167 A * 12/1978 Richey ....................... 175/323
4,411,470 A 10/1983 Nishimura et al.
4,489,979 A 12/1984 Zyngier
4,545,618 A * 10/1985 Kitamura .................... 297/410
4,568,123 A * 2/1986 Yasui et al. ................. 297/410
4,589,698 A * 5/1986 Suzuki ....................... 297/410
4,657,425 A * 4/1987 Takahashi ................... 403/104
4,854,642 A 8/1989 Vidwans et al.
5,080,437 A 1/1992 Pesta et al.
5,484,189 A 1/1996 Patterson
5,788,250 A 8/1998 Masters et al.
5,816,658 A * 10/1998 Wallis ....................... 297/410
2003/0205925 A1 11/2003 Ford
2003/0222491 A1 12/2003 Isaacson

FOREIGN PATENT DOCUMENTS

FR 2 819 456 A1 7/2002
FR 2 824 115 A1 10/2002
GB 2 315 409 A 2/1998
JP 05329033 A * 12/1993

* cited by examiner

*Primary Examiner*—Peter M. Cuomo
*Assistant Examiner*—Sarah B. McPartlin
(74) *Attorney, Agent, or Firm*—Brooks Kushman P.C.

(57) ABSTRACT

An automotive seat assembly comprising a seat back frame, a headrest, and at least one post supporting the headrest on the seat back frame for vertical adjustment. The seatback frame has at least one opening for receiving the post. A tubular bushing is disposed in the opening of the seatback frame where the opening has a bore for receiving the post. The tubular bushing has a spring disposed in the bore, wherein the spring is used to adjust a clamping force on the post allowing vertical movement of the headrest.

19 Claims, 2 Drawing Sheets

20 20 23 34 38 26 30 24 18 24 28 44 48 51 52 46 40 42

ADJUSTABLE HEAD RESTRAINT GUIDE

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates to a vehicle seat having a moveable head restraint.

2. Background Art

Manufacturers of motor vehicles provide head restraints, i.e. headrests, for occupant seats as a comfort and safety feature. Ease of movement of such head restraints is important for the overall function of the seat. Vertical adjustment mechanisms typically include one or more rods or posts extending downwardly from the head restraint and into the seatback.

The posts are generally supported in bushings which are, in turn, retained in the seatback frame. Examples of such bushings known to the prior art are disclosed in U.S. Pat. No. 5,788,250 to Masters et al., U.S. Pat. No. 4,854,642 to Vidwans et al., and U.S. Pat. No. 5,080,437 to Pesta et al. Squeak and rattle issues caused by several moving parts along with high costs are problematic with the prior art.

SUMMARY OF THE INVENTION

The present invention has the advantage of providing a quiet, easy to use, and cost effective way of providing vertical movement of a head restraint in a vehicle seat.

In one aspect of the invention, an automotive seat assembly is provided comprising a seat back frame, a headrest, and at least one post supporting the headrest on the seat back frame for vertical adjustment. The seatback frame has at least one opening for receiving the post. A tubular bushing is disposed in the opening of the seatback frame where the opening has a bore for receiving the post. The tubular bushing has a spring disposed in the bore, wherein the spring is used to adjust a clamping force on the post allowing vertical movement of the headrest.

DETAILED DESCRIPTION OF THE PREFERRED EMBODIMENT(S)

Figure 1:
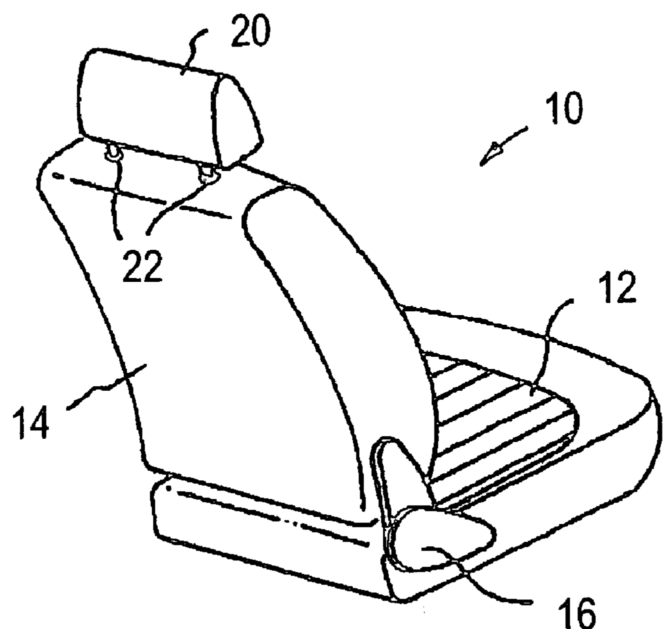
FIG. 1 is a perspective view of an automotive seat assembly with a headrest.
Figure 2:
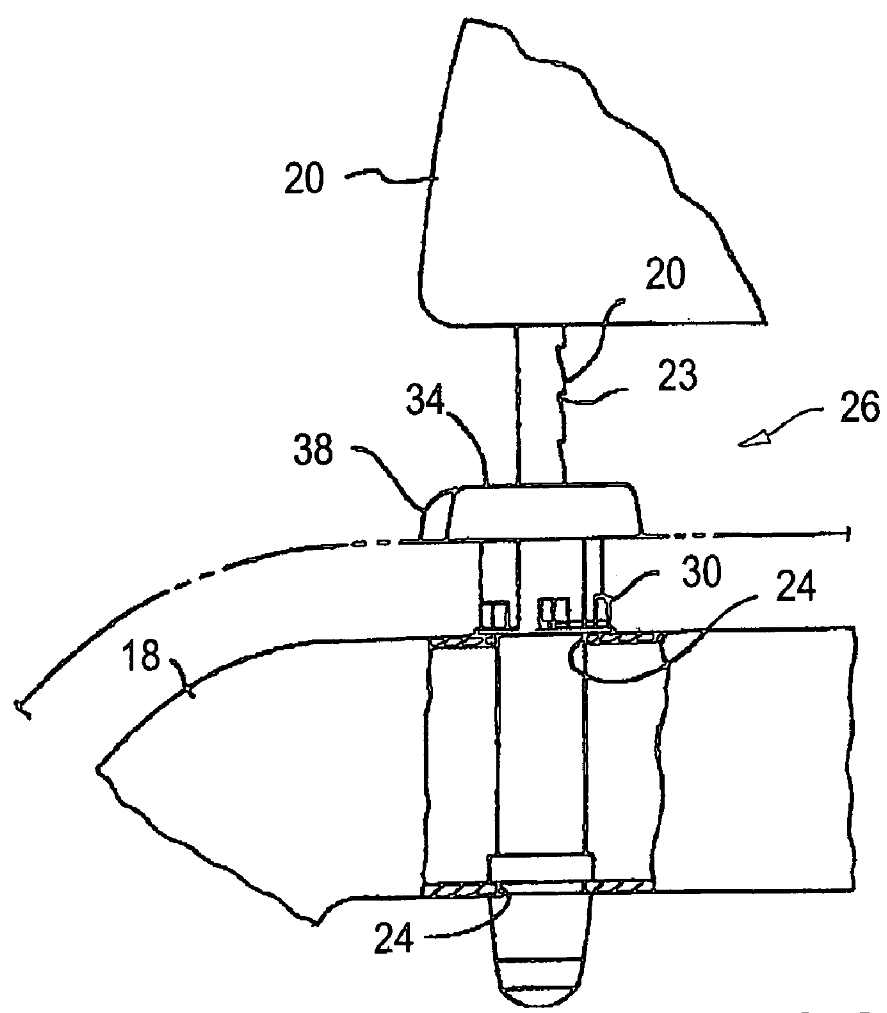
FIG. 2 is a fragmentary side view of a portion of a seatback with a tubular bushing.

Referring to FIGS. 1 and 2, an automotive seat assembly is generally shown at 10. The automotive seat assembly 10 comprises a generally horizontal seat 12 upon which an occupant sits and a seat back 14 pivotally supported on the seat 12 by the adjusting hinge mechanism 16. The seat back 16 includes a frame 18 usually made of metal.

Referring to FIG. 2, a headrest 20 is supported at the top of the seatback frame 18 by at least one post or rod 22. The post(s) 22 support the headrest 20 on the seatback 14 and facilitates vertical adjustments. The seatback frame 18 includes a pair of holes or openings 24 extending there through with each opening 24 presenting a periphery for receiving a tubular bushing 26. A longitudinal bore in tubular bushing 26 receives post 22.

Figure 3:
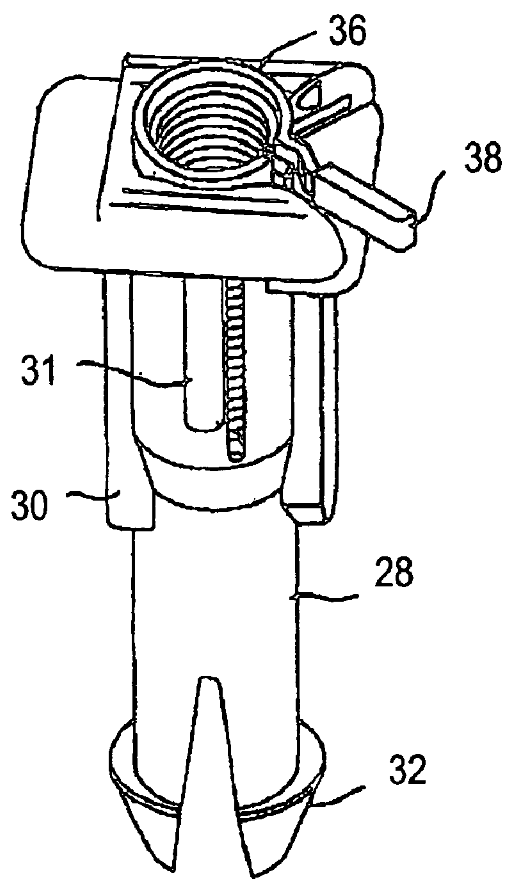
FIGS. 3 and 4 are perspective views of a tubular bushing having a spring according to one embodiment of the present invention.
Figure 4:
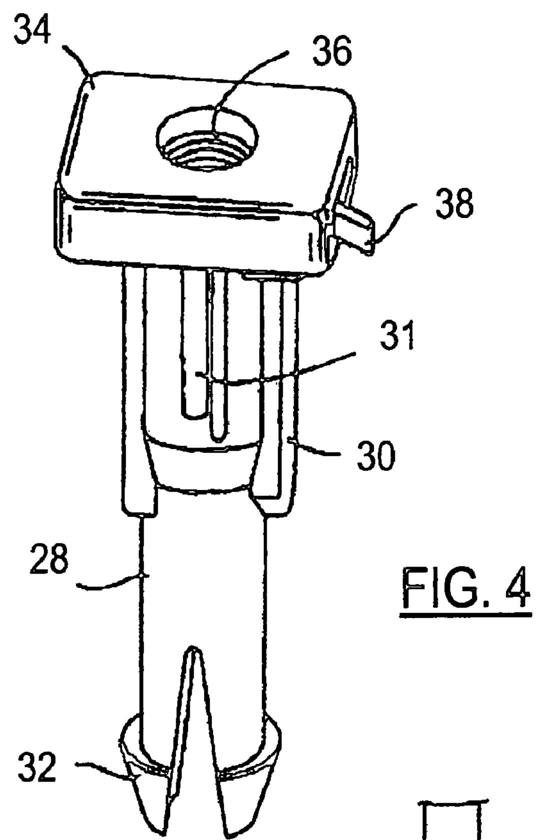

A first embodiment of the invention is shown in greater detail in FIGS. 3 and 4. The bushing 26 includes a guide sleeve 28 extending vertically from a top portion to a bottom portion of bushing 26. Guide sleeve 28 includes ribs 30 extending longitudinally along a first side and a second side of guide sleeve 28. The opening 24 includes matching slots to receive ribs 30 such that rotational movement of bushing 26 is prevented within opening 24. In addition to ribs 30, guide sleeve 28 includes stop 31 which rests on seatback frame 18 preventing bushing 26 from extending through opening 24. Bushing 26 further includes locking tabs 32 which are located at a bottom end of guide sleeve 28. Locking tabs 32 are tapered such that engagement of guide sleeve 28 to opening 24 is keyed such that bushing 26 cannot be removed from opening 24 without compression of locking tabs 32. These locking tabs 32 are designed to prevent vertical movement and subsequent release of bushing 26. Attached to the top portion of bushing 26 is a cap 34. The cap 34 retains a spring 36 within guide sleeve 28. Spring 36 extends vertically down guide sleeve 28 and receives post 22 along its interior. Spring 36 ends in an extension having a tab 38 extending outwardly from cap 34. Tab 38 can be rotated around the axis of spring 36 to increase the diameter of spring 36 by partly uncoiling it thereby releasing a clamping force on post 22 by causing the spring 36 to disengage from notches 23 in post 22 allowing headrest 20 to move up and down.

Figure 5:
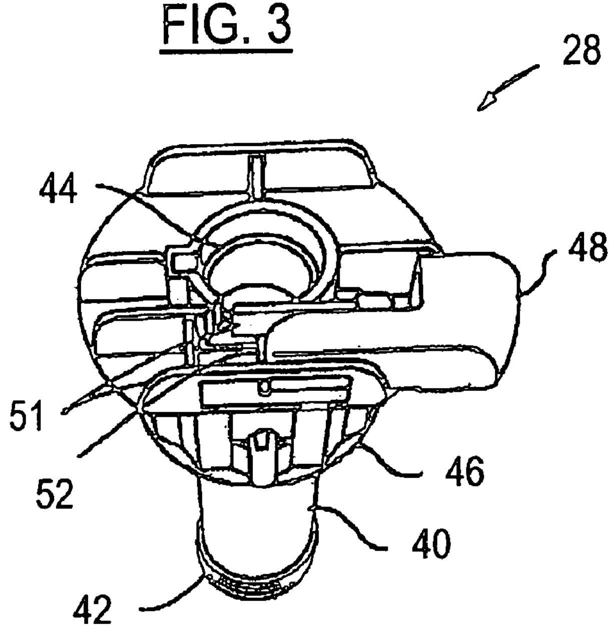
FIG. 5 is a perspective view of another embodiment of a tubular bushing.
Figure 6:
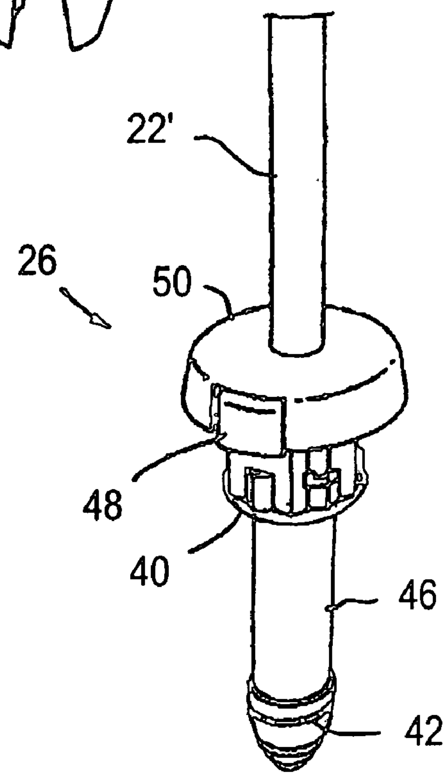
FIG. 6 is a further perspective view of the tubular bushing of FIG. 5 disposed proximate a headrest post.

Referring to FIGS. 5 and 6, a second embodiment of bushing 26 is shown. Bushing 26 includes a guide sleeve 40 extending vertically from a top portion to a bottom portion of bushing 26. Guide sleeve 40 includes a stop 46 which rests on seatback frame 18 preventing bushing 26 from extending through opening 24. Bushing 26 further includes spiral or threaded locking tabs 42 which prevent bushing 26 from being removed from opening 24. Attached to the top portion of bushing 26 is a cap 50. Cap 50 covers a spring 44 which is disposed within guide sleeve 40. Spring 44 extends vertically down guide sleeve 40 and is able to receive post 22' which is smooth and without notches. Spring 44 has a generally constant diameter along its length. This allows for infinite flexibility in moving headrest 20 up and down. Adjacent and in communication with spring 44 is tab 48. Tab 48 slides along the top portion of guide sleeve 28 within guidewalls 51 while pressing tangentially against spring extension 52. When in a rest or retracted position as shown in FIG. 5, tab 48 is in a fully retracted position allowing spring 48 to have a smallest diameter therefore preventing post 22' from sliding up and down. When tab 48 is in a fully extended position, spring 48 will have a largest diameter therefore allowing post 22' to slide freely up and down.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat for use in a vehicle, the vehicle seat comprising:

a seatback having a frame, the frame including an upper surface having a first aperture and a lower surface having a second aperture, the first and second apertures being coaxially arranged;

a head restraint arrangement having a headrest and a support member connected to the headrest, the support member having an exterior surface;

a tubular bushing assembly extending through the first and second apertures, the tubular bushing assembly including:

a sleeve having an outer surface and a tubular body that defines a cavity, a first sleeve end disposed proximate a cavity opening, a second sleeve end disposed opposite the first sleeve end, a flange disposed proximate the first sleeve end and extending generally perpendicular from the tubular body, a stop portion disposed adjacent to the sleeve, the stop portion being disposed adjacent to the flange and extending from the flange toward the second sleeve end, a spring having a coiled portion disposed in the cavity and a first spring extension disposed near the first sleeve end that extends out of the cavity adjacent to an upper surface of the flange, and an actuator attached to the first spring extension and disposed adjacent to the flange, the actuator being configured to move linearly along the flange between a retracted position and an extended position;

wherein the spring exerts a biasing force against the exterior surface of the support member to inhibit movement of the support member relative to the tubular bushing when the actuator is in the retracted position and wherein the biasing force exerted by the spring against the exterior surface is reduced to permit axial movement of the support member relative to the tubular bushing when the actuator is in the extended position.

2. The vehicle seat of claim 1 wherein the exterior surface of the support member is generally smooth and free of notches.

3. The vehicle seat of claim 1 wherein the spring is a coiled torsion spring.

4. The vehicle seat of claim 1 further comprising a cap disposed proximate the flange for retaining the actuator and covering the flange, the cap including an opening through which the actuator at least partially extends.

5. The vehicle seat of claim 1 wherein the stop portion further comprises an outer surface and a plurality of ribs extending outwardly from the outer surface and disposed in a direction extending between the flange and second sleeve end, the plurality of ribs being spaced apart from each other and inhibiting rotation of sleeve relative to the frame.

6. The vehicle seat of claim 1 wherein the plurality of ribs have a generally linear configuration.

7. The vehicle seat of claim 1 wherein the second sleeve end further comprises a spiral locking tab for securing the second sleeve end against the lower surface.

8. The vehicle seat of claim 1 wherein the flange further comprises an upper surface and first and second guide walls extending from the upper surface, the first and second guide walls being disposed generally parallel and spaced apart from each other to receive the actuator, the first guide wall having a slot disposed proximate the upper surface through which the first spring extension extends.

9. The vehicle seat of claim 8 wherein the actuator has a generally L-shaped configuration defined by a first portion disposed between the first and second guide walls and a second portion extending generally perpendicular to the first portion, wherein the second portion contacts the first guide wall when the actuator is in the extended position and is spaced apart from the first guide wall when the actuator is in the retracted position.

10. The vehicle seat of claim 1 wherein the spring further comprises a second spring extension attached to the sleeve.

11. A vehicle seat for use in a vehicle, the vehicle seat comprising:

a seatback having a frame, the frame including an upper surface having a first aperture and a lower surface having a second aperture, the first and second apertures being coaxially arranged;

a head restraint arrangement having a headrest and a support member connected to the headrest, the support member having an exterior surface;

a tubular bushing assembly extending through the first and second apertures, the tubular bushing assembly including:

a sleeve having an outer surface and a tubular body that defines a cavity, a first sleeve end disposed proximate a cavity opening, a second sleeve end disposed opposite the first sleeve end, a flange disposed proximate the first sleeve end and extending generally perpendicular from the tubular body, a plurality of ribs spaced apart from each other along the ribs'entire length and extending from the outer surface for inhibiting rotation of sleeve relative to the frame, the plurality of ribs extending from the flange toward the second sleeve end, a spring having a coiled portion disposed in the cavity and a first spring extension disposed near the first sleeve end that extends out of the cavity adjacent to an upper surface of the flange, and an actuator attached to the first spring extension and disposed adjacent to the flange, the actuator being configured to move along the flange between a retracted position and an extended position to rotate the spring about a center axis;

wherein the spring exerts a biasing force against the exterior surface of the support member to inhibit movement of the support member relative to the tubular bushing when the actuator is in the retracted position and wherein the biasing force exerted by the spring against the exterior surface is reduced to permit axial movement of the support member relative to the tubular bushing when the actuator is in the extended position.

12. The vehicle seat of claim 11 wherein the exterior surface of the support member includes a plurality of spaced apart notches and wherein the spring engages at least one of the spaced apart notches when the actuator is in the retracted position.

13. The vehicle seat of claim 11 further comprising a stop portion disposed adjacent to the outer surface of the sleeve, spaced apart from the plurality of ribs, and extending from the flange toward the second sleeve end, wherein the stop portion has a shorter length than the plurality of ribs to allow plurality of ribs to extend through the first aperture when the stop portion contacts the upper surface of the frame.

14. The vehicle seat of claim 11 wherein the actuator further comprises a ring shaped engagement feature, the ring shaped engagement feature being disposed around the cavity opening and having an opening for receiving the first spring extension.

15. The vehicle seat of claim 14 further comprising a handle attached to the ring shaped engagement feature, the handle being coaxially disposed with the first spring extension.

16. The vehicle seat of claim 11 wherein the spring is a coiled torsion spring.

17. The vehicle seat of claim 11 further comprising a cap disposed proximate the flange for retaining the actuator and covering the flange, the cap including an opening through which the actuator at least partially extends.

18. The vehicle seat of claim 11 wherein the second sleeve end further comprises a spiral locking tab for securing the second sleeve end against the lower surface.

19. The vehicle seat of claim 11 wherein the spring further comprises a second spring extension attached to the sleeve.

* * * * *